Dec. 27, 1966    F. JARCHOW ETAL    3,293,948
PLANETARY TRANSMISSION ARRANGEMENT
Filed Dec. 24, 1964    2 Sheets-Sheet 1

INVENTORS
Friedrich Jarchow
Joseph Hannen

BY Michael J. Striker

Dec. 27, 1966    F. JARCHOW ETAL    3,293,948
PLANETARY TRANSMISSION ARRANGEMENT
Filed Dec. 24, 1964    2 Sheets-Sheet 2
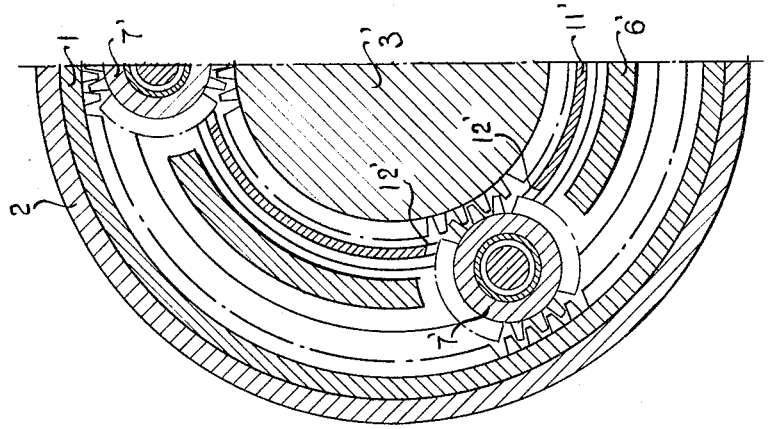
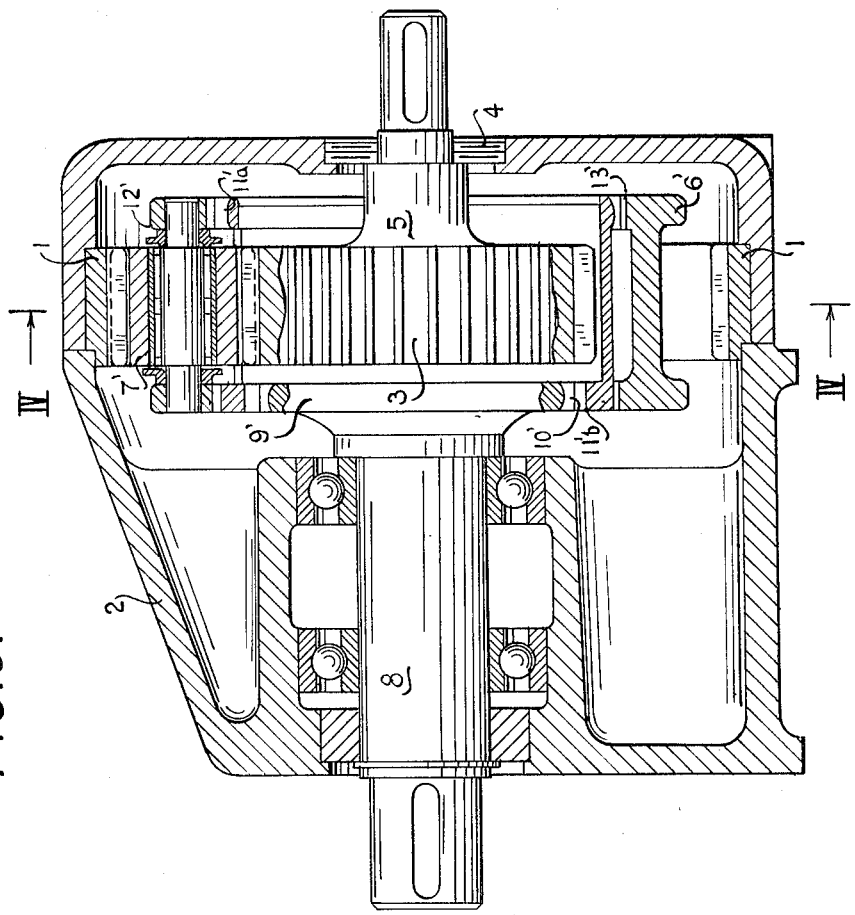
INVENTORS
Friedrich Jarchow
Joseph Kunnen
BY
Michael J. Striker
Attorney United States Patent Office 3,293,948
Patented Dec. 27, 1966

1

3,293,948
PLANETARY TRANSMISSION ARRANGEMENT
Friedrich Jarchow, Essen-Bredeney, and Joseph Kunnen,
Lank, near Krefeld, Germany, assignors to Rheinstahl
Huttenwerke A.G., Essen, Germany
Filed Dec. 24, 1964, Ser. No. 421,125
Claims priority, application Germany, Dec. 24, 1963,
R 36,877
15 Claims. (Cl. 74—801)

The present invention relates to a planetary transmission arrangement, and more particularly to a planetary transmission provided with a freely mounted planetary gear carrier.

Planetary transmissions of this type are known in which a coupling connects the planetary gear carrier with the drive shaft or driven shaft of the transmission so that the pressure between the teeth of the planetary gears and the other gears of the transmission is equalized.

Couplings used for this purpose have two axially spaced gears, and the axial distance between the coupling gears must not be below a certain minimum distance, since otherwise the free self-adjustability of the planetary gear carrier or spider is detrimentally affected. As a result, the coupling is comparatively long and bulky and expensive to manufacture.

It is one object of the invention to overcome the disadvantages of known transmission arrangements of this type, and to provide a planetary transmission arrangement with a coupling between a transmission element, preferably the planetary gear carrier or spider, and a transmission shaft. Another object of the invention is to provide in a planetary transmission, a coupling having one coupling part located on one side and another coupling part located on the other side of the transmission so that the axial extension of the transmission is used for the coupling, and a minimum of axial space is taken up.

Another object of the invention is to provide the coupling between the planetary carrier and a shaft of the transmission with an intermediate part extending either between the planetary gears and the sun gear of the transmission, or between the planetary gears and the orbit gear of the transmission.

With these objects in view, the present invention relates to a planetary transmission arrangement including a coupling with the drive shaft or driven shaft. One embodiment of the invention comprises a planetary transmission including a plurality of rotary transmission elements, one of which is a planetary carrier; an input shaft and an output shaft, one of the shafts being connected to one of the transmission elements for rotation with the same, for example with the sun gear or with the orbit gear of the transmission; and coupling means including a first coupling part located on one side of the transmission and being coupled to another transmission element, preferably to the planetary carrier for rotation therewith, a second coupling part located on the other side of the transmission and coupled with the other shaft for rotation therewith, and an intermediate part extending between the first and second coupling parts from one side of the transmission to the other side. The intermediate part may extend between the sun gear and the planetary gears, or between the orbit gear and the planetary gears, and has openings or cutouts through which the planetary gear pass or project.

In the preferred embodiments of the invention, the intermediate part is tubular, and the coupling parts are gears on the ends of the tubular part, meshing with corresponding gears on the planetary carrier and on a flange of the above-mentioned other shaft.

Due to the fact that the coupling means has substantially the same length as the transmission, and is co-

2 extensive with the same, no additional axial space is required for coupling means between the planetary gear carrier and the respective shaft, which may be the drive shaft or the driven shaft. A substantial reduction of the axial length of the transmission is obtained, and it is even possible to increase the axial distance between the first and second coupling parts of the coupling means as compared with known constructions in which this distance was designed to be short in order to keep the added length to a minimum. However, for the best equalization of the tooth pressure of the planetary transmission, the greater length of the coupling means between the first and second coupling parts is highly advantageous.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is an axial sectional view illustrating another embodiment of the invention; and FIG. 4 is a fragmentary cross-sectional view taken on line IV—IV in FIG. 3.

Figure 2:
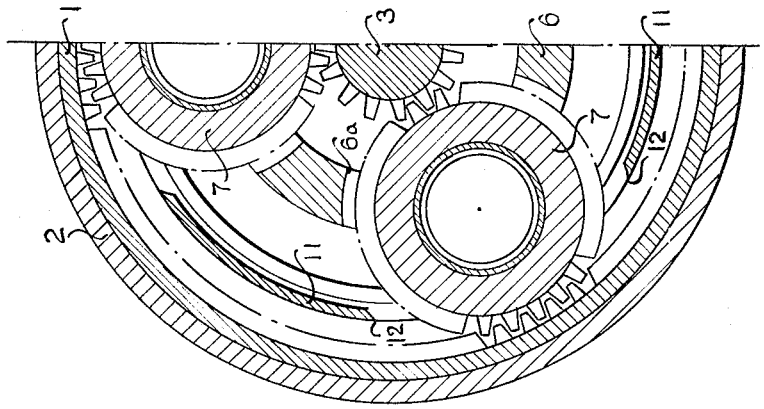
FIG. 2 is a fragmentary cross-sectional view taken on line II—II in FIG. 1.

Corresponding parts of the embodiments respectively illustrated in FIGS. 1 and 2 and FIGS. 3 and 4, are indicated by the same reference numerals which, however, are primed in FIGS. 3 and 4.

Referring now to the two embodiments of the invention as illustrated in the drawing, the orbit gear 1, or 1' is fixedly secured to a casing 2. A sun gear 3 or 3' is connected to a shaft 5 for rotation, shaft 5 being mounted on casing 2 and surrounded by a sealing means 4 which closes the inner cavity of casing 2.

Three planetay gears 7 or 7' are disposed between the gear teeth of the sun gear and the orbit gear, and are mounted on a planetary gear carrier on spider 6 or 6' for rotation on the same, and with the same during rolling of the planetary gears on the orbit gear and sun gear.

The planetary gear carrier 6 or 6' is not supported on the casing, but only on the sun gear 3 or 3' and the orbit gear 7 or 7'. Shaft 5 is preferably the drive shaft of the transmission, and shaft 8 is preferably the driven shaft, mounted by ball bearings in a portion of casing 2 in a position coaxial with shaft 5. A flange 9 or 9' is fixed on shaft 8 and has an outer toothed coupling portion 10 or 10'.

Figure 1:
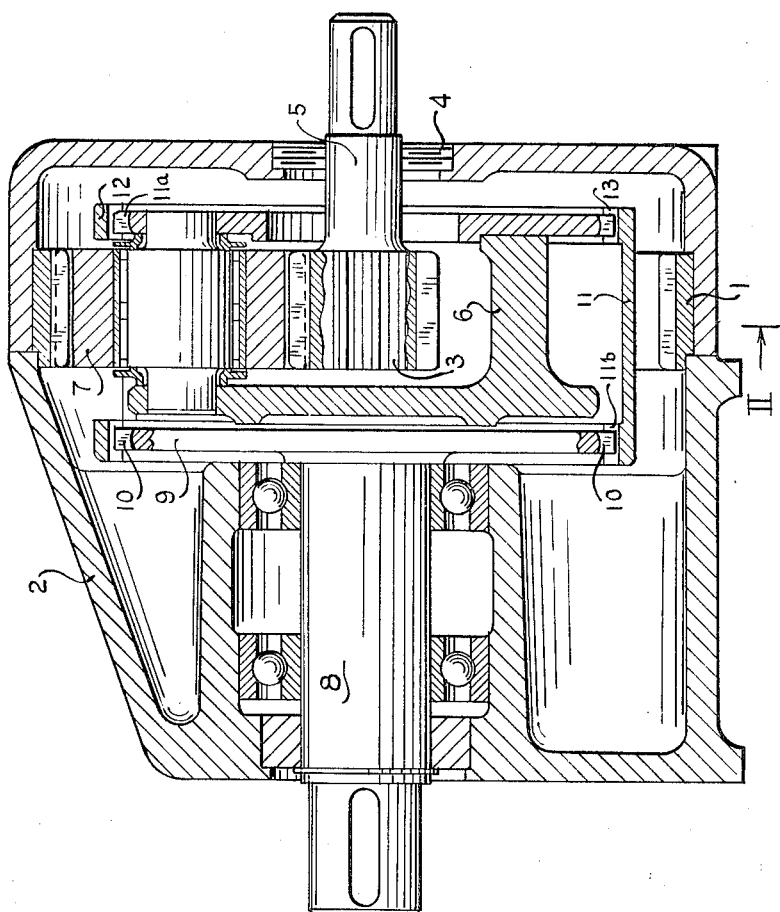
FIG. 1 is an axial sectional view illustrating one embodiment of a planetary transmission arrangement according to the invention.

Referring now particularly to the embodiment of FIGS. 1 and 2, the planetary gear carrier has parts located on opposite sides of gears 3, 7, and 1 and provided with bearings for the stub shafts of the planetary gears 7. The center portion of the planetary gear carrier 6 is annular, as best seen in FIG. 2, and has cutouts for the planetary gears 7. The part of the planetary gear carrier 6 which is located on the right side of the transmission, as viewed in FIG. 1, has an outer toothed coupling portion 13.

A coupling means 11 is of generally tubular shape and coaxial with shafts 8 and 5. A first coupling part 11a is located on the right side of the transmission, as viewed in FIG. 1 and has an inner toothed coupling portion 11a meshing with the outer toothed coupling portion 13. A second coupling part is located on the left side of the transmission, as viewed in FIG. 1, and has an inner toothed coupling portion 11b meshing with the toothed coupling portion 10 of connecting flange 9. The intermediate tubular part which connects coupling elements 11a and 11b, extends between the orbit gear 1 and the planetary carrier 6, as best seen in the lower part of FIG. 1. The tubular intermediate part of the coupling means has cutouts 12 in the regions of the planetary gears 7 so that the planetary gears project through cutouts 12 into engagement with the orbit gear 1.

It will be seen that the planetary gear carrier 6 is connected by a coupling means 11 and by two axially spaced meshing toothed couplings to the output shaft 8, so that a slight movement of the planetary gear carrier 6 relative to shaft 8 is possible whereby the position of the teeth of the planetary gears is adjusted in accordance with the pressure prevailing between the teeth of the transmission, so that the pressure between the teeth is equalized assuring a smooth running of the planetary transmission. It is evident that due to play between the engaging teeth of coupling portions 13, 11a and 10, 11b, the relative position between shaft 8 and the planetary gears is variable to a small extent, and that the axis of shaft 8 may define a small angle with the axis of the planetary gear carrier 6 if such displacement is required to achieve a complete equal distribution of the pressure between the teeth of the planetary gears and the teeth of the sun gear and orbit gear.

In the embodiment of FIGS. 3 and 4, the coupling means 11' includes an outer toothed coupling portion 11'a located on one side of a transmission, and an inner toothed coupling portion 11'b located on the other side of the transmission. The planetary gear carrier 6' has an inner toothed coupling portion 13' meshing with the outer coupling portion 11'a, while the inner toothed coupling portion 11'b meshes with the toothed connecting coupling portion 10' on flange 9' of shaft 8. Coupling portions 11'a and 11'b are connected by an intermediate tubular part which extends between the planetary gear carrier 6' and the sun gear 3'. As best seen in FIG. 4, the tubular part of the coupling means 11' has cutouts 12' through which the planetary gears 7' project toward sun gear 3'.

In both embodiments of the invention, the coupling means is coextensive with the transmission so that the axial length of the transmission is used for providing the necessary axial spacing between the coupling parts or coupling portions 11a, 11b or 11'a, 11'b without substantially increasing the axial length of the transmission.

The coupling means of the present invention provides a flexible connection between shaft 8 and the planetary gear carrier. If it is desired to achieve an even better distribution of the pressure between the teeth, sun gear 3 or 3', or more particularly the shaft portion 5 thereof, is connected by a flexible coupling, not shown, with a drive shaft, not shown.

The axially spaced toothed coupling portions of the coupling means permits a relative displacement of the axes of shaft 8 and of the planetary gear carrier in at least two transverse planes. The same result can be achieved by other types of coupling means, for example, the engaging portions of the coupling means may be replaced by a fixed coupling, and the intermediate tubular part of the coupling means may be made of a flexible material. It is also contemplated to provide a rigid coupling means with resilient joints respectively connected to shaft 8 and to the planetary gear carrier, but in all modifications of the invention, the coupling means is coextensive in axial direction with the transmission, so that no additional axial space is required for the coupling between a transmission element and a shaft.

It will be understood that each of the elements described above, or two or more together, may also find a useful application in other types of a transmission arrangement differing from the types described above.

While the invention has been illustrated and described as embodied in a planetary gear arrangement provided with a coupling means extending in axial direction of the transmission between the planetary gear carrier, and either the sun gear or the orbit gear of the transmission and connecting the planetary gear carrier with a shaft, it it not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A planetary transmission arrangement comprising, in combination, a planetary transmission including a plurality of rotary transmission elements having toothed portions; two shafts, one of said shafts being connected to one of said transmision elements for rotation with the same; and coupling means including a first coupling part located on one side of said transmission, said first coupling part including a toothed coupling portion engaging a toothed portion of another one of said transmission elements so as to be coupled with the same for rotation therewith, a second coupling part located on the other side of said transmission and coupled with the other shaft for rotation therewith, and an intermediate part extending between said first and second coupling parts and between two of said transmission elements from one side of said transmission to the other side so that said other shaft is coupled with said transmission without a substantial increase of the length of the transmission arrangement.

2. A planetary transmission arrangement comprising, in combination, a planetary transmission including a plurality of rotary transmission elements having toothed portions; two shafts, one of said shafts being connected to one of said transmission elements for rotation with the same, and the other shaft having a toothed portion; and coupling means including a first coupling part located on one side of said transmission, said first coupling part including a toothed coupling portion engaging a toothed portion of another one of said transmission elements so as to be coupled with the same for rotation therewith, a second coupling part located on the other side of said transmission and including a toothed coupling portion engaging said toothed portion of said other shaft so as to be coupled with the same for rotation therewith, and an intermediate part extending between said first and second coupling parts and between two of said transmission elements from one side of said transmission to the other side so that said other shaft is coupled with said transmission without a substantial increase of the length of the transmission arrangement.

3. A planetary transmission arrangement comprising, in combination, a planetary transmission including a plurality of rotary transmission elements having toothed portions, and planetary gears; two shafts, one of said shafts being connected to one of said transmission elements for rotation with the same, and the other shaft having a toothed portion, and coupling means including a first coupling part located on one side of said transmission, said first coupling part including a toothed coupling portion engaging a toothed portion of another one of said transmission elements so as to be coupled with the same for rotation therewith, a second coupling part located on the other side of said transmission and including a toothed coupling portion engaging said toothed portion of said other shaft so as to be coupled with the same for rotation therewith, and an intermediate part extending between said first and second coupling parts and between two of said transmission elements from one side of said transmission to the other side so that said other shaft is coupled with said transmission without a substantial increase of the length of the transmission arrangement, said intermediate part having openings for said planetary gears.

4. A planetary transmission arrangement comprising, in combination, a planetary transmission including two circular gears having a common axis, a spider rotatable about said axis and including a toothed portion, and planetary gear means mounted on said spider and meshing with said circular gears; a first shaft connected to one of said circular gears for rotation therewith; a second shaft having a toothed connecting portion; and coupling means including a first toothed coupling element located on said one side of said transmission and engaging the toothed portion of said spider, a second toothed coupling element located on the other side of said transmission and engaging said toothed connecting portion of said second shaft, and an intermediate part connecting said first and second coupling elements and extending from one side of said transmission to the other side so that said second shaft is coupled with said transmission without a substantial increase of the axial length of the transmission arrangement.

5. A planetary transmission arrangement comprising, in combination, a planetary transmission including two circular gears having a common axis, a spider rotatable about said axis and having a toothed portion, and planetary gear means mounted on said spider and meshing with said circular gears; a drive shaft connected to one of said circular gears for rotation therewith; a driven shaft having a toothed connecting portion; and coupling means including a first toothed coupling element located on said one side of said transmission and engaging the toothed portion of said spider, a second toothed coupling element located on the other side of said transmission and engaging said toothed connecting portion, and an intermediate part connecting said first and second coupling elements and extending from one side of said transmission to the other side so that said driven shaft is coupled with said transmission without a substantial increase of the axial length of the transmission arrangement.

6. A planetary transmission arrangement comprising, in combination, a planetary transmission including two circular gears having a common axis, a spider rotatable about said axis and having a toothed portion, and planetary gear means mounted on said spider and meshing with said circular gears; a first shaft connected to one of said circular gears for rotation therewith; a second shaft having a toothed connecting portion; and coupling means including a first toothed coupling element located on said one side of said transmission and engaging said toothed portion of said spider, a second toothed coupling element located on the other side of said transmission and engaging said toothed connecting portion, and an intermediate part connecting said first and second coupling elements and extending from one side of said transmission to the other side between one of said circular gears and said spider so that said second shaft is coupled with said transmission without a substantial increase of the axial length of the transmission arrangement.

7. A planetary transmission arrangement comprising, in combination, a planetary transmission including two circular gears having a common axis, a spider rotatable about said axis and having a toothed portion, and planetary gear means mounted on said spider and meshing with said circular gears; a first shaft connected to one of said circular gears for rotation therewith; a second shaft having a toothed connecting portion; and coupling means including a first toothed coupling element located on said one side of said transmission and engaging said toothed portion of said spider, a second toothed coupling element located on the other side of said transmission and engaging said toothed connecting portion, and an intermediate part connecting said first and second coupling elements and extending from one side of said transmission to the other side between one of said circular gears and said spider so that said second shaft is coupled with said transmission without a substantial increase of the axial length of the transmission arrangement, said intermediate part being tubular and having cutouts for said planetary gear means.

8. A planetary transmission arrangement comprising, in combination, a planetary transmission including two circular gears having a common axis, a spider rotatable about said axis and having a toothed portion, and planetary gear means mounted on said spider and meshing with said circular gears; a first shaft connected to one of said circular gears for rotation therewith; a second shaft having an outer toothed connecting portion; and coupling means including a first toothed coupling element located on said one side of said transmission and engaging said toothed portion of said spider, a second internally toothed coupling element lcoated on the other side of said transmission and engaging said outer toothed connecting portion, and an intermediate part connecting said first and second coupling elements and extending from one side of said transmission to the other side between one of said circular gears and said spider so that said second shaft is coupled with said transmission without a substantial increase of the axial length of the transmission arrangement.

9. A planetary transmission arrangement comprising, in combination, a planetary transmission including two circular gears having a common axis, one of said circular gears being a sun gear, a spider rotatable about said axis and having an inner toothed portion on one side of said transmission, and planetary gear means mounted on said spider and meshing with said circular gears; a first shaft connected to one of said circular gears for rotation therewith; a second shaft having an outer toothed connecting portion; and coupling means including a first externally toothed element located on said one side of said transmission and engaging said inner toothed portion of said spider, a second internally toothed coupling element located on the other side of said transmission and engaging said outer toothed connecting portion, and an intermediate part connecting said first and second coupling elements and extending from one side of said transmission to the other side between said sun gear and said spider so that said second shaft is coupled with said transmission without a substantial increase of the axial length of the transmission arrangement.

10. A planetary transmission arrangement comprising, in combination, a planetary transmission including a rotary sun gear and a stationary orbit gear having a common axis, a spider rotatable about said axis and having an outer toothed portion on one side of said transmission, and planetary gears mounted on said spider and meshing with said sun gear and orbit gear; a first shaft located on said one side of said transmission and connected to said sun gear for rotation therewith; a second shaft coaxial with said first shaft located on the other side of said transmission and having an outer toothed connecting portion; and coupling means including an internally toothed first coupling element located on said one side of said transmission and engaging said outer toothed portion of said spider, an internally toothed second coupling element located on the other side of said transmission and engaging said outer toothed connecting portion, and a tubular part connecting said first and second coupling elements and extending between said orbit gear and said spider from one side of said transmission to the other side so that said second shaft is coupled with said transmission and first shaft without a substantial increase of the axial length of the transmission arrangement.

11. A planetary transmission arrangement comprising, in combination, a planetary transmission including a rotary sun gear and a secondary orbit gear having a common axis, a spider rotatable about said axis and having an externally toothed portion on one side of said transmission, and planetary gears mounted on said spider and meshing with said sun gear and orbit gear; a first shaft located on said one side of said transmission and connected to said sun gear for rotation therewith; a second shaft coaxial with said first shaft located on the other side of said transmission and having an externally toothed connecting portion; and coupling means including an internally toothed first coupling element located on said one side of said transmission and engaging said externally toothed portion of said spider, an internally toothed second coupling element located on the other side of said transmission and engaging said externally toothed connecting portion, and a tubular part connecting said first and second coupling elements and extending between said orbit gear and said spider from one side of said transmission to the other side so that said second shaft is coupled with said transmission and first shaft without a substantial increase of the axial length of the transmission arrangement, said tubular part having cutouts through which said planetary gears project toward said orbit gear.

12. A planetary transmission arrangement comprising, in combination, a planetary transmission including a rotary sun gear and a stationary orbit gear having a common axis, a spider rotatable about said axis and having an internally toothed portion on one side of said transmission, and planetary gears mounted on said spider and meshing with said sun gear and orbit gear; a first shaft located on said one side of said transmission and connected to said sun gear for rotation therewith; a second shaft coaxial with said first shaft located on the other side of said transmission and having an externally toothed connecting portion; and coupling means including an externally toothed first coupling element located on said one side of said transmission and engaging said internally toothed portion of said spider, an internally toothed second coupling element located on the other side of said transmission and engaging said externally toothed connecting portion, and a tubular part connecting said first and second coupling elements and extending between said sun gear and said spider from one side of said transmission to the other side so that said second shaft is coupled with said transmission and first shaft without a substantial increase of the axial length of the transmission arrangement.

13. A planetary transmission arrangement comprising, in combination, a planetary transmission including a rotary sun gear and a stationary orbit gear having a common axis, a spider rotatable about said axis and having an internally toothed portion on one side of said transmission, and planetary gears mounted on said spider and meshing with said sun gear and orbit gear; a first shaft located on said one side of said transmission and connected to said sun gear for rotation therewith; a second shaft coaxial with said first shaft located on the other side of said transmission and having an externally toothed connecting portion; and coupling means including an externally toothed first coupling element located on said one side of said transmission and engaging said internally toothed portion of said spider, an internally toothed second coupling element located on the other side of said transmission and engaging said externally toothed connecting portion, and a tubular part connecting said first and second coupling elements and extending between said sun gear and said spider from one side of said transmission to the other side so that said second shaft is coupled with said transmission and first shaft without a substantial increase of the axial length of the transmission arrangement, said tubular part having cutouts through which said planetary gears project toward said sun gear.

14. A planetary transmission arrangement comprising, in combination, a planetary transmission including a rotary sun gear and a stationary orbit gear having a common axis, a spider rotatable about said axis and having an internally toothed portion on one side of said transmission, and planetary gears mounted on said spider and meshing with said sun gear and orbit gear; a drive shaft located on said one side of said transmission and connected to said sun gear for rotation therewith; a driven shaft coaxial with said first shaft located on the other side of said transmission and having an externally toothed connecting portion; and coupling means including an externally toothed first coupling element located on said one side of said transmission and engaging said internally toothed portion of said spider, an internally toothed second coupling element located on the other side of said transmission and engaging said externally toothed connecting portion, and a tubular part connecting said first and second coupling elements and extending between said sun gear and said spider from one side of said transmission to the other side so that said driven shaft is coupled with said transmission and drive shaft without a substantial increase of the axial length of the transmission arrangement.

15. A planetary transmission arrangement comprising, in combination, a planetary transmission including a rotary sun gear and a stationary orbit gear having a common axis, a spider rotatable about said axis and having an externally toothed portion on one side of said transmission, and planetary gears mounted on said spider and meshing with said sun gear and orbit gear; a drive shaft located on said one side of said transmission and connected to said sun gear for rotation therewith; a driven shaft coaxial with said first shaft located on the other side of said transmission and having an externally toothed conneting portion; and coupling means including an internally toothed first coupling element located on said one side of said transmission and engaging said externally toothed portion of said spider, an internally toothed second coupling element located on the other side of said transmission and engaging said externally toothed connecting portion, and a tubular part connecting said first and second coupling elements and extending between said orbit gear and said spider from one side of said transmission to the other side so that said driven shaft is coupled with said transmission and drive shaft without a substantial increase of the axial length of the transmission arrangement.

References Cited by the Examiner

UNITED STATES PATENTS

| | | | |
|---|---|---|---|
| 1,370,080 | 3/1921 | Ahond | 74—796 |
| 1,417,797 | 5/1922 | Cook et al. | 74—801 |
| 2,144,937 | 1/1939 | Ryder | 74—801 |
| 2,460,629 | 2/1949 | Fawick | 74—801 |
| 2,555,586 | 6/1951 | Falk | 74—410 |
| 2,700,311 | 1/1955 | Bade | 74—410 X |
| 2,749,778 | 6/1956 | Kuhn | 74—801 |
| 2,893,268 | 7/1959 | Liebel | 74—801 |
| 2,922,321 | 1/1960 | Hiersig et al. | 74—801 |

FOREIGN PATENTS

| | | |
|---|---|---|
| 963,414 | 1/1950 | France. |
| 817,490 | 7/1959 | Great Britain. |
| 266,948 | 8/1929 | Italy. |
| 237,465 | 9/1945 | Switzerland. |

DAVID J. WILLIAMOWSKY, *Primary Examiner.*

THOMAS C. PERRY, *Assistant Examiner.*